United States Patent [19]
Gisko

[11] Patent Number: 6,076,954
[45] Date of Patent: Jun. 20, 2000

[54] CONTINUOUS VACUUM PROCESSOR WITH INTEGRAL RAW MATERIAL MIXING

[75] Inventor: Jerry A. Gisko, Darien, Ill.

[73] Assignee: Gisco, Inc., Willowbrook, Ill.

[21] Appl. No.: 09/244,199

[22] Filed: Feb. 4, 1999

[51] Int. Cl.[7] ............................... B01F 13/06; B01F 7/08
[52] U.S. Cl. ............................ 366/139; 366/75; 366/88; 366/143; 366/323; 425/203
[58] Field of Search .................. 366/64, 66, 75, 366/79, 88–91, 96–99, 139, 186, 163.1, 152.6, 194–196, 318, 323, 143; 425/203, 205, 208, 209; 422/135

[56] References Cited

U.S. PATENT DOCUMENTS

| | | |
|---|---|---|
| 2,041,619 | 5/1936 | Steele . |
| 2,078,565 | 4/1937 | Durst et al. . |
| 2,572,063 | 10/1951 | Skipper . |
| 3,361,537 | 1/1968 | Ferrante . |
| 3,493,031 | 2/1970 | Williams, Jr. et al. . |
| 3,633,494 | 1/1972 | Schippers et al. ...................... 425/208 |
| 3,781,132 | 12/1973 | Latinen . |
| 3,797,550 | 3/1974 | Latinen ................................... 425/203 |
| 3,801,286 | 4/1974 | Anolick et al. . |
| 4,134,736 | 1/1979 | Hammond, Jr. ......................... 422/135 |
| 4,902,455 | 2/1990 | Wobbe ..................................... 366/323 |
| 5,332,423 | 7/1994 | Gisko et al. . |
| 5,662,415 | 9/1997 | Gisko . |
| 5,716,130 | 2/1998 | Wood ....................................... 366/139 |

OTHER PUBLICATIONS

EM–45/3 Continuous Casting Machine—GISCO.
CP–45VAC Continuous Vacuum Processor—GISCO.

*Primary Examiner*—Charles E. Cooley
*Attorney, Agent, or Firm*—Hill & Simpson

[57] ABSTRACT

A cast polymer integral mixing and vacuum processor system and method for delivering substantially void-free viscous polymer employs a motor connected to a mixing screw. A tube surrounds the mixing screw with one end of the tube being fixedly connected relative to the motor. The mixing screw has a thread thereon having varying pitch zones. In a loading thread pitch zone a relatively wide thread pitch is provided for receiving dry material filler at a filler input and resin at a resin input. At a first mixing and sealing thread pitch zone, a relatively narrow thread pitch is provided so as to form a vacuum seal and provide mixing of the resin with the filler material. At a void removal thread pitch zone a substantially wide thread pitch is provided and at which a vacuum tower is located in which a vacuum is maintained to remove voids formed by gas in mixed material. Finally, at a second mixing and sealing thread pitch zone adjacent the nozzle a relatively narrow thread pitch is provided so as to form a vacuum seal and for further mixing of catalyst which is introduced adjacent one end of the second mixing and sealing thread pitch zone.

19 Claims, 2 Drawing Sheets

CONTINUOUS VACUUM PROCESSOR WITH INTEGRAL RAW MATERIAL MIXING

BACKGROUND OF THE INVENTION

The present invention relates to a vacuum processing to create a void-free (no air bubbles) output of a viscous polymer which later hardens and is used in the manufacture of sinks, counter tops, and also road construction materials such as polymer concrete for bridges and other uses.

It is known from previous U.S. Pat. No. 5,662,415 to first mix a filler material (dry material) with a mixer machine. Additional additives may also be provided in the mixer machine. The output from the mixer machine typically fills a bowl-like container. Thereafter, material is delivered from the container to a continuous vacuum processor machine which removes voids (air bubbles), adds catalyst and possibly additional additives, and then outputs a cast polymer in viscous form for use in the above-indicated fields. This is also known as an automated cast polymer process system.

A disadvantage of the prior art systems is that two machines are required—both a mixer machine and a vacuum processing machine. Additionally, setup time and cleaning are more difficult with two machines. Furthermore, in the previous continuous vacuum processors, a mechanical vacuum seal is required.

SUMMARY OF THE INVENTION

It is an object of the present invention to reduce the cost of the prior art systems for automated cast polymer processing.

It is a further object of the present invention to simplify operation of automatic cast polymer processing equipment, to make the system more user friendly and to reduce cleaning time.

According to the present invention, a cast polymer integral mixing and vacuum processor system is provided for delivering substantially void-free viscous polymer. A variable speed motor is connected to a mixing screw, the mixing screw being angled downwardly with respect to horizontal. A tube surrounds the mixing screw, one end of the tube being fixedly connected relative to the motor and the other end having an output nozzle. The mixing screw has a thread thereon and which: in a loading thread pitch zone has a relatively wide thread pitch for receiving dry material filler at a filler input and a resin at a resin input; a first mixing and sealing thread pitch zone which has a relative narrow thread pitch and which provides a vacuum seal and mixing of the resin with the filler material; a void removal thread pitch zone having a substantially wide thread pitch of the thread and at which a vacuum tower is located in which a vacuum is maintained to remove voids formed by gas in mixed material; and finally a second mixing and sealing thread pitch zone adjacent the nozzle having a relatively narrow thread pitch for providing a vacuum seal and for further mixing of catalyst which is introduced adjacent one end of the second mixing and sealing thread pitch zone.

According to the present invention, cost is substantially reduced since one machine is employed rather than two. Secondly, less space is occupied by the single machine as compared to the previous two discrete machines.

Also with the present invention, it is easier to clean because only one machine needs to be cleaned rather than two. Furthermore, by combining the two machines into one, it is more user friendly, and simpler to operate.

As a further advantage of the present invention, there is less chance for contamination by elimination of the reservoir bowl between the two machines in the prior system.

A further advantage of the present invention is the elimination of a mechanical vacuum seal at a bearing portion of the machine where a rotating screw is received.

DESCRIPTION OF THE PREFERRED EMBODIMENTS

Figure 1:
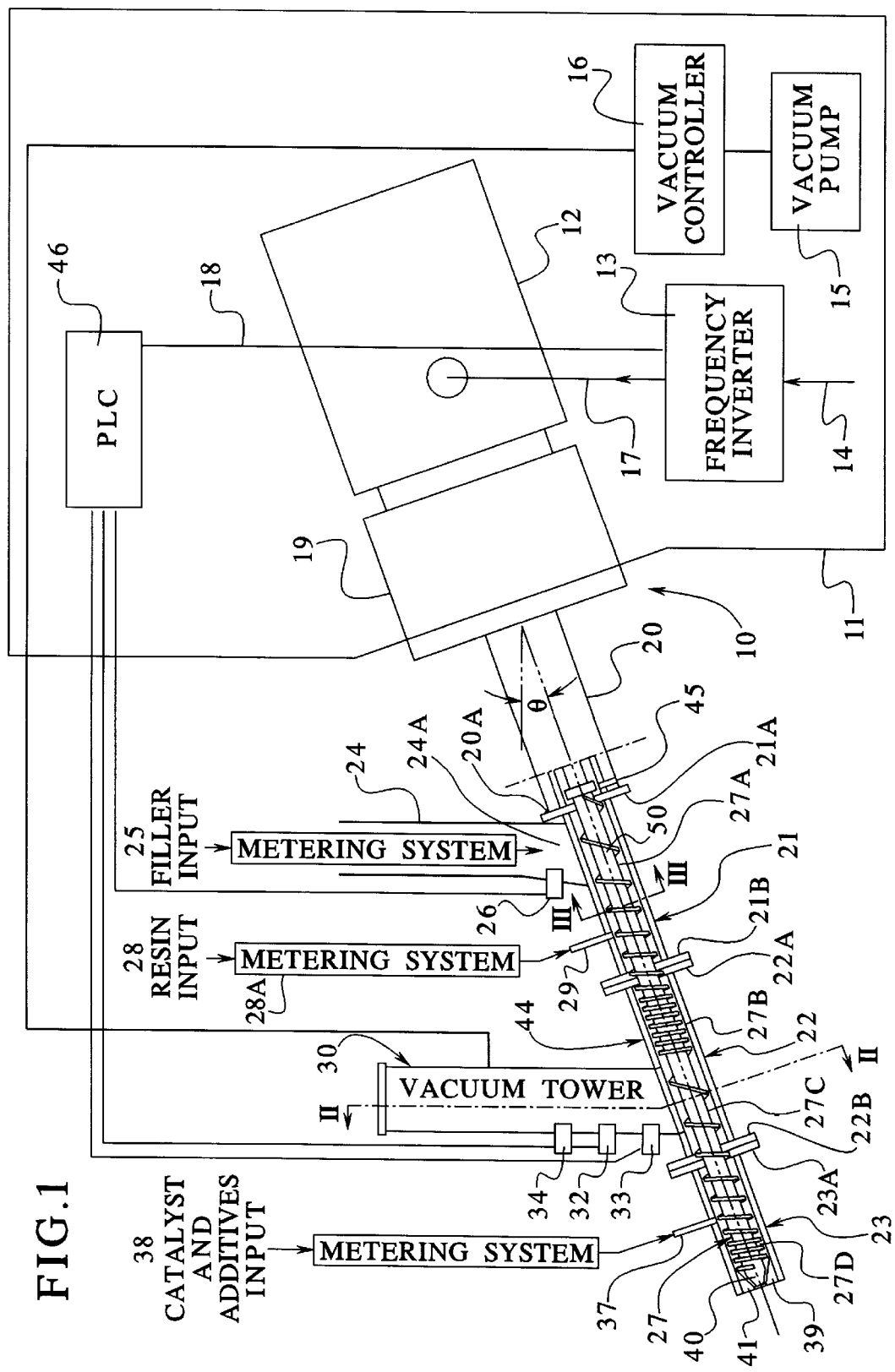
FIG. 1 is an overall view of the integral mixer-vacuum processor according to the present invention.

The system for creating a viscous polymer which dries to form a void-free solid surface cast polymer is shown generally at 10 in FIG. 1 which represents the integral mixer-vacuum processor system of the present invention. The system is partially housed by a cabinet 11 containing a main motor 12 which is controlled in known prior art fashion by a frequency inverter 13 driven by the main power source 14. A vacuum pump 15 is also provided in known prior art fashion for delivering a vacuum via a vacuum controller 16 to a vacuum tower 30 discussed later.

The frequency inverter 13 delivers signals on line 17 to the main motor 12 for providing a variable speed output of the main motor to a gear transmission 19. Additionally, the frequency inverter 13 outputs on data line 18 speed information to the programmable logic control PLC 46.

A bearing housing 20 is attached to the transmission 19. The bearing housing 20 receives a mixing screw 27.

The mixing screw 27 along with the bearing housing 20 are set at an angle of Θ equal to 20° or greater relative to the horizontal. This minimum angle is important to prevent a matrix of material formed by the filler material 25 mixed with the resin 28 from rising up in the vacuum tower 30.

The output speed by the motor 12 for turning the mixing screw 27 via the transmission 19 is important since the speed of the screw determines the output rate of material, viscosity of the mixed material, affects the vacuum sealing as discussed hereafter, and is also a function of the particle size of the drawing material. A wide range of speeds is required to handle various operating situations.

The frequency inverter 13 controls speed, acceleration, and deceleration.

The gear box transmission 19 is a step down and provides the driving torque necessary for the mixing screw 27.

The mixing screw is enclosed within a tubular arrangement of three components—namely a loading zone section 21, a mixing and seal section 22, and a catalyzing, mixing, and output seal section 23. The section 21 has a first end flange 21A mating with an end face 20A of the bearing housing 20. At the other end, the loading zone section 21 has a flange 21B which mates with a flange 22A of the mixing and seal section 22. A flange 22B at the other end of the mixing and seal section 22 mates with a flange 23A of the catalyzing, mixing, and output seal section 23. An output nozzle 39 is provided at the other end of the section 23 as described hereafter in greater detail.

The loading zone section 21 is for receiving raw materials including the filler (dry material) 25 delivered via a metering unit 24. The metering unit 24 at filler input 24A and resin 28 delivered via a metering unit 28A through resin input 20 can deliver a single material or can be a multiple metering unit system for metering in amounts of a plurality of dry materials.

The mixing screw 27 has a thread 50 (see also FIG. 3) thereon of varying pitch. In a loading thread pitch zone 27A a relatively wide thread pitch is provided with a substantial continuous narrowing of the thread pitch into a first mixing and sealing thread pitch zone 27B. From the narrow thread pitch zone 27B, there is a widening of the thread pitch at a void removal thread pitch zone 27C. From the void removal thread pitch zone 27C there is a substantially continuous narrowing of the thread pitch into a second mixing and sealing thread pitch zone 27D where catalyst 38 and possibly additional additives are added at input 37.

The filler metering unit 24 has a capacitive proximity switch 26 for controlling filler fault, and detects for a rising level of the mixture of the resin and filler material (hereinafter known as a matrix of material). When the switch 26 is triggered, filling of the metering unit 24 stops.

Figure 2:
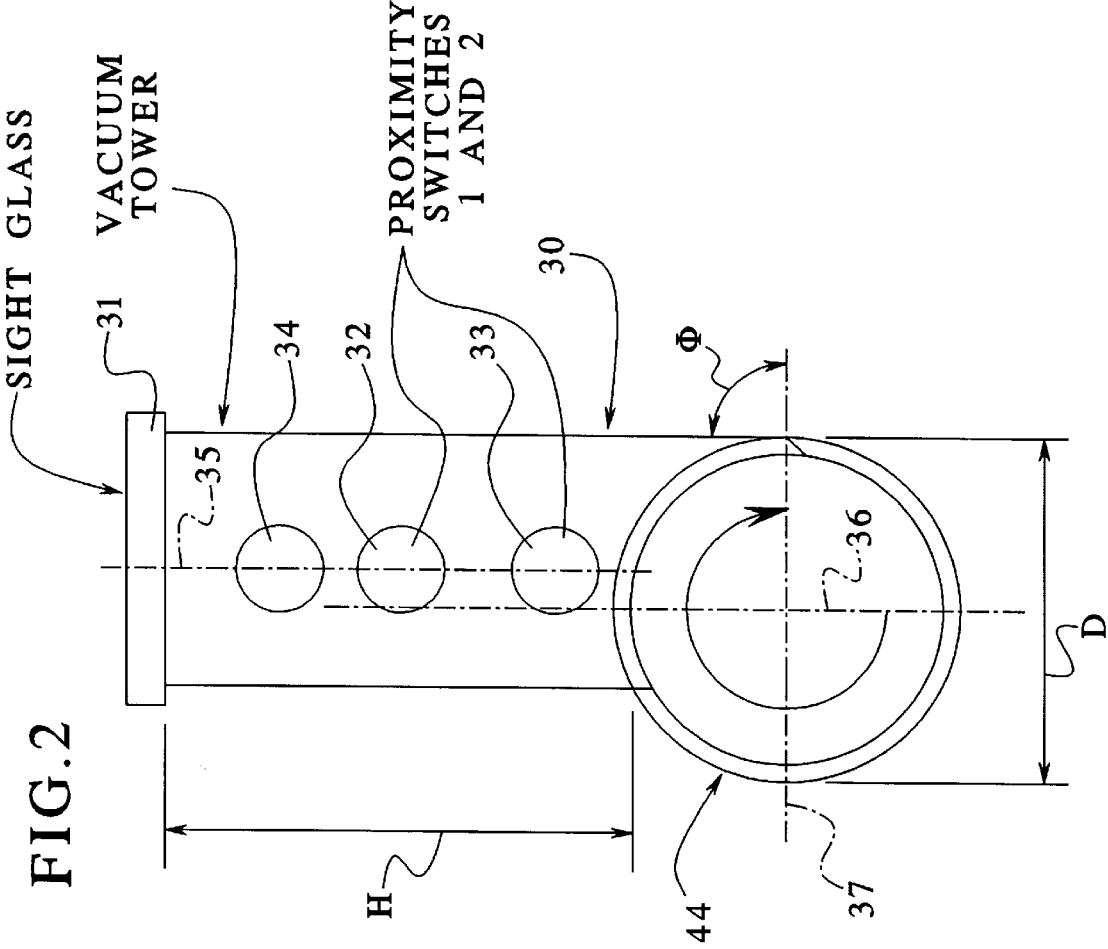
FIG. 2 is a view taken along line II—II showing the vacuum tower of the present invention.

The vacuum tower 30, shown in greater detail in FIG. 2, has a height H extending from the top of the outer tube generally indicated at 44 to the top of the vacuum tower 30 of at least 10 inches minimum. Additionally, the vacuum tower 30 has a center line 35 which is offset from the vertical center line 36 of the tube 44 as shown in FIG. 2. Also, it is important that the side wall of the vacuum tower 30 extends down to form a 90° angle φ with the horizontal center line 37 of the tube 44.

Preferably, the vacuum fed to the vacuum tower 30 is in a range from 10 to 30 inches of Hg.

A viewing window 31 also known as a sight glass is provided at the top of the vacuum tower 30 for viewing the material at the bottom of the vacuum tower from which voids (air pockets or bubbles) are being removed.

If the vacuum in the tower is too high (greater than 30 inches of Hg) then there is the danger that certain resin components such as styrene will evaporate. If the vacuum is too low, then there may not be enough vacuum for effectively removing voids.

The vacuum tower 30 may have a light 34 as shown in FIG. 2 for illumination of material when looking through the site glass. Also, a capacitive proximity switch 32 for an emergency is provided for completely shutting off the system if material in the vacuum tower becomes too high. Finally, a capacitive proximity switch 33 is provided for controlling the level of matrix in the vacuum tower 30. This switch can regulate screw speed, for example.

A diameter D of the tube 44 is a function of the particle sizes, output volume pre-entered time, and speed of the screw.

Figure 3:
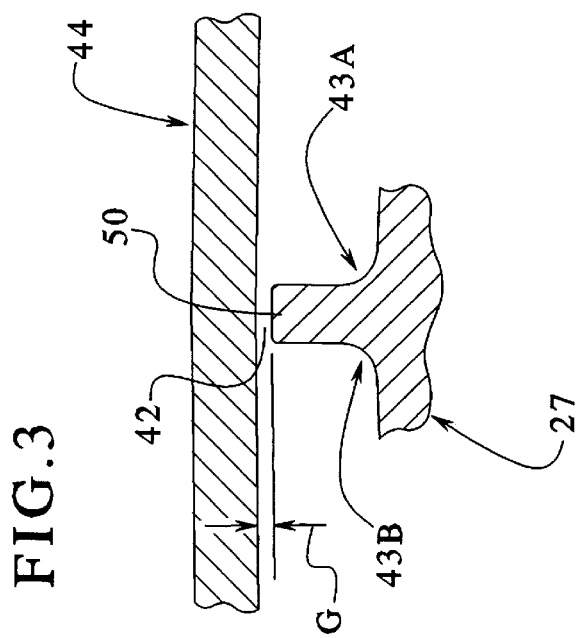
FIG. 3 is a cross-sectional view taken along line III—III showing the screw thread for the mixing screw employed in the machine of FIG. 1.

As shown in FIG. 3, the diameter of the tube 44 along with the thread height of the thread 28 on the mixing screw 27 determines a gap G. By selecting different size threads on different mixing screws 27, this gap can be adjusted. The gap is a function of particle size of the dry material, dependent on the resin and/or other additives and/or catalyst, and a speed of the screw 27.

Importantly, as shown in FIG. 3, a radius 43A and a radius 43B for transition into the thread 50 from the main body of the screw 27 each have a radius of at least 0.375 inches. This is a minimum dimension to allow self-cleaning of the system and to prevent material such as resin or resin mixed with the filler material and/or other additives from sticking in the corners at the base of both sides of the thread 50. In FIG. 3, the gap G is shown at 42.

The catalyst 38 together with additional possible additives, which are input at the catalyst input 37, can preferably be input by a metering system not shown in greater detail.

The output nozzle 39 can provide injection if necessary. The nozzle aids in the sealing for the vacuum by being shaped to correspond with the tapered end 40 of the main body of the mixing screw 27.

The programmable logic control 46 connects to the three previously mentioned switches 26, 32, and 33, light 34 and of course also receives over an input line 18 the data input from the frequency inverter 13 with speed and acceleration/deceleration information. Also via the line 18, the PLC controls the speed of the main motor 12 via the frequency inverter 13.

Although not shown in detail, the PLC, of course, may also control additional functions such as the metering of the filler input, the metering of the resin input, the metering of the catalyst input, and the vacuum magnitude.

The following is important to note with the invention. Because the vacuum maintained at the vacuum tower is sealed off by the mixing screw narrow thread zone 27B to the right and by the narrow thread mixing screw zone 27D to the left, there is no need to provide a mechanical vacuum seal at the flange 21A, as was done in the prior art system. This has a considerable construction advantage.

Secondly, with the present invention, it is noted how the functions performed by two discrete machines in the prior art have now been combined into one machine, thus substantially lowering cost. Space is also saved, of course.

Because a single machine is easier to operate than two machines, the system is more user friendly. Also, it is easier to clean the system because one machine rather than two machines are involved, and there is no mixing container between two machines. Furthermore, quality is improved since there is less chance for contamination since one machine is involved rather than two, and also there is no mixing container which can become contaminated between two machines.

Although various minor modifications might be suggested by those skilled in the art, it should be understood that I wish to embody within the scope of the patent warranted hereon all such modifications as reasonably and properly come with the scope of my contribution to the art.

I claim as my invention:

1. A cast polymer integral mixing and vacuum processor system for delivering substantially void-free viscous polymer, comprising:

a variable speed motor connected to a mixing screw, said mixing screw being angled downwardly with respect to horizontal;

a tube surrounding the mixing screw, one end of the tube being fixedly connected relative to the motor and the other end having an output nozzle; and the mixing screw having a thread thereon and which in a loading thread pitch zone has a relatively wide thread pitch for receiving dry material filler at a filler input and resin at a resin input, a first mixing and sealing thread pitch zone which has a relatively narrow thread pitch and which provides a vacuum seal and mixing of the resin with the filler material, a void removal thread pitch zone having a relatively wide thread pitch and at which a vacuum tower is located in which a vacuum is maintained to remove voids formed by gas in mixed material, and finally a second mixing and sealing thread pitch zone adjacent the nozzle having a relatively narrow thread pitch for providing a vacuum seal and for further mixing of catalyst introduced adjacent one end of the second mixing and sealing thread pitch zone.

2. The system according to claim 1 wherein a bearing housing is provided between the motor and the mixing screw, the tube mounts to the bearing housing, and a mechanical vacuum seal is not provided at a joint between the tube and the bearing housing.

3. The system according to claim 1 wherein the tube for the mixing screw has a loading zone section which has said filler input along with said resin input attached thereto, a mixing and seal section to which the vacuum tower is attached, and a catalyzing, mixing, and sealing output section to which a material catalyst input is attached for inputting said catalyst and at said one end where the nozzle is received.

4. The system according to claim 3 wherein the loading zone section has a flange at one end which abuts a first flange of the mixing and seal section, a second flange of the mixing and seal section abutting with a flange of the catalyzing, mixing, and sealing output section.

5. The system according to claim 1 wherein the vacuum tower has a vertical center line which is offset from a vertical center line of the tube.

6. The system according to claim 5 wherein the vacuum tower has one side wall which extends down to a tangent with the tube so that a 90° angle is formed between said side wall and a horizontal center line of the tube.

7. The system according to claim 1 wherein the thread on the mixing screw has a substantially flat top surface forming a gap with respect to an inner side wall of the tube, and wherein a base of the thread both in a leading and trailing direction of the thread has a curved section having a radius of at least 0.375 inches.

8. The system according to claim 1 wherein the vacuum tower has a height of at least 10 inches from a top of the tube to a top of the vacuum tower.

9. The system according to claim 1 wherein a vacuum controller connected to a vacuum pump supplies vacuum to the vacuum tower between 10 and 30 inches of Hg.

10. The system according to claim 1 wherein the vacuum tower has an emergency proximity switch for shutting off the system if matrix material representing a mixture of resin and dry material filler extends too high in the vacuum tower.

11. The system according to claim 1 wherein the vacuum tower has a proximity switch for controlling a level of matrix material representing a mixture of resin and dry filler material in the vacuum tower.

12. The system according to claim 1 wherein the filler input has a proximity switch for detecting an excessive backup of dry material filler in the filler input.

13. The system according to claim 1 wherein a programmable logic control is provided connected to sensors associated with the mixing screw for changing or stopping turning of the mixing screw.

14. The system according to claim 1 wherein the variable speed motor is controlled by a frequency inverter.

15. The system according to claim 1 wherein the vacuum tower has a sight glass and a light for viewing matrix material representing a mixture of resin and dry filler material within the vacuum tower.

16. The system according to claim 1 wherein the mixing screw connects to said variable speed motor through a bearing housing and a gear box transmission providing a step down in speed between the motor and the screw.

17. A method for integrally mixing and vacuum processing material for delivering a substantially void-free viscous material, comprising the steps of:

providing a single machine having a mixing screw driven by a motor, said mixing screw having a thread thereon of varying pitch;

at one end of the screw inputting filler material and resin material which are mixed;

providing a first thread pitch zone of the screw having a relatively narrow thread pitch and serving as a first vacuum seal after the input of the filler and resin material;

after the first thread pitch zone providing a vacuum region where a vacuum removes gas from a mixture of the resin and filler material;

after the vacuum region adding catalyst to mixed material at the screw; and after catalyst addition providing a second thread pitch zone of the screw having a relatively narrow thread pitch and serving as a second vacuum seal after the addition input of the catalyst.

18. The method according to claim 17 wherein the resin and filler are added in a loading thread pitch zone and having a relatively wide thread pitch and followed by a first mixing and sealing thread pitch zone which includes said first thread pitch zone, which in turn is followed by a void removal thread pitch zone having a relatively wide thread pitch where a vacuum tower which provides said vacuum is located, and which is followed by a second mixing and sealing thread pitch zone which includes said second thread pitch zone and where said catalyst is added.

19. An integral mixing and vacuum processor system for delivering substantially void-free viscous material, comprising:

a motor connected to a mixing screw;

a tube surrounding the mixing screw, one end of the tube being fixedly connected relative to the motor and the other end having an output nozzle; and the mixing screw having a thread thereon and which in a loading pitch zone has a relatively wide thread pitch for receiving dry material filler at a filler input and resin at a resin input, a first mixing and sealing thread pitch zone which has a relatively narrow thread pitch and which provides a vacuum seal and mixing of the resin with the filler material, a void removal thread pitch zone having a substantially wide thread pitch and at which a vacuum region is located in which a vacuum is maintained to remove voids formed by gas in mixed material, and finally a second mixing and sealing thread pitch zone adjacent the output nozzle having a relatively narrow thread pitch for providing a vacuum seal and for further mixing of catalyst which is introduced adjacent one end of the second mixing and sealing thread pitch zone.

* * * * *